US008711406B2

(12) United States Patent
Ito

(10) Patent No.: US 8,711,406 B2
(45) Date of Patent: Apr. 29, 2014

(54) MOVABLE ASSEMBLIES FOR AN IMAGE READER UNIT AND A COVER UNIT IN AN IMAGE FORMATION APPARATUS

(75) Inventor: Sakae Ito, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 294 days.

(21) Appl. No.: 13/023,761

(22) Filed: Feb. 9, 2011

(65) Prior Publication Data

US 2011/0211223 A1 Sep. 1, 2011

(30) Foreign Application Priority Data

Feb. 26, 2010 (JP) ................................ 2010-041719

(51) Int. Cl.
*G06F 3/12* (2006.01)

(52) U.S. Cl.
USPC .......... 358/1.15; 358/296; 399/107; 399/110; 399/367; 399/380

(58) Field of Classification Search
CPC .............. G03G 2221/1678; G03G 2221/1684; G03G 2221/1687; H04N 1/00519; H04N 1/00551; H04N 1/00554; G06F 1/1681
USPC ......... 358/1.15, 296; 399/107, 110, 367, 379, 399/380
See application file for complete search history.

(56) References Cited

U.S. PATENT DOCUMENTS

| | | | | |
|---|---|---|---|---|
| 7,295,792 B2 | 11/2007 | Ito | | |
| 2006/0083542 A1 | 4/2006 | Ito | | |
| 2006/0088336 A1 | 4/2006 | Hirose et al. | | |
| 2007/0097393 A1 * | 5/2007 | Suzuki | ......................... | 358/1.12 |
| 2007/0201111 A1 * | 8/2007 | Osakabe et al. | .............. | 358/497 |
| 2008/0037076 A1 * | 2/2008 | Ohama et al. | ................. | 358/498 |

FOREIGN PATENT DOCUMENTS

| | | | |
|---|---|---|---|
| JP | 09-261422 | 10/1997 | |
| JP | 09261422 A * | 10/1997 | .............. H04N 1/19 |
| JP | 10-186742 | 7/1998 | |
| JP | 2001-238014 A | 8/2001 | |
| JP | 2006-119236 A | 5/2006 | |
| JP | 2006-119474 | 5/2006 | |
| JP | 2006-119497 | 5/2006 | |
| JP | 2008-262037 | 10/2008 | |

OTHER PUBLICATIONS

Notification of Reasons for Rejection issued in corresponding Japanese Patent Application No. 2010-041719 dated Jun. 4, 2013.

* cited by examiner

*Primary Examiner* — Jacky X Zheng
(74) *Attorney, Agent, or Firm* — Banner & Witcoff, Ltd.

(57) ABSTRACT

An image forming apparatus is provided. The image forming apparatus includes a main chassis, an image reader unit, a cover unit, a first movable assembly, which rotatably supports the cover unit to be rotatable with respect to the image reader unit, and a second movable assembly, which rotatably supports the image reader unit to be rotatable with respect to the main chassis. The first movable assembly includes a support member, which supports the cover unit to be vertically movable with respect to the image reader unit, and a frame, which is arranged on the image reader unit and accommodates the support member. The first movable assembly is arranged to have a lower end thereof to be in a lower position with respect to a lower end of the image reader unit. The second movable assembly is arranged in a lower position with respect to the first movable assembly.

8 Claims, 10 Drawing Sheets

MOVABLE ASSEMBLIES FOR AN IMAGE READER UNIT AND A COVER UNIT IN AN IMAGE FORMATION APPARATUS

CROSS REFERENCE TO RELATED APPLICATION

This application claims priority from Japanese Patent Application No. 2010-041719, filed on Feb. 26, 2010, the entire subject matter of the which is incorporated herein by reference.

BACKGROUND

1. Technical Field

An aspect of the present invention relates to a multi-functional image forming apparatus.

2. Related Art

An image forming apparatus having an image reader unit and a document cover unit has been conventionally known. In the image forming apparatus, the document cover unit may be rotatable with respect to the image reader unit (see FIGS. 10A-10C). The conventional image forming apparatus 200 shown in FIGS. 10A-10C is provided with a document cover 230, which is rotatable with respect to an image reader unit 220 about a first hinge 231, whilst the image reader unit 220 is rotatable about a second hinge 221 with respect to a main body 210.

Additionally to the rotating movement, the document cover 230 is also movable vertically with respect to the image reader unit 220 (see FIG. 10B) when, for example, a user wishes to have a page in a document with substantial thickness (e.g., a book) read by the image reader unit 220. In order to enable the vertical movement of the document cover 230 including the first hinge 231, the image forming apparatus 200 is provided with a supporting piece 233, which supports the vertical movement of the first hinge 231. Further, the image reader unit 200 is provided with a frame 235, which accommodates the supporting piece 233 therein when the document cover 230 is in a lower position. In order to have the image reader unit 220 to read the page in a book with thickness, the supporting piece 233 is required to have substantial height, and the frame 235 to accommodate the supporting piece 233 is required to have substantial height accordingly. Meanwhile, when downsizing of the image forming apparatus 200 is required, it is preferable that the image reader unit 220 is designed to be smaller in height thereof. However, when the image reader unit 220 is designed to be smaller in the height, and when the frame 235 is designed to have substantial height, a lower edge of the frame 235 may protrude downward beyond the height of the image reader unit 220.

SUMMARY

In the image forming apparatus 200, however, the frame 235 and the second hinge 221 are arranged in horizontally overlapping positions. Therefore, when the image reader unit 220 is rotated with respect to the main body 210 with the downwardly-protrusive frame 235, the frame 235 may interfere with the main body 210 (see FIG. 10C). Thus, the image forming apparatus 200 may be designed to reserve space to accommodate the rotated frame 235 in the main body 210. In this regard, usage of the internal space in the main body 210 may be limited, or some of the internal space may be wasted.

In view of the above, the present invention is advantageous in that an image forming apparatus with the image reader unit and the frame, in which the lower end of the frame protrudes downward beyond the height of the image reader unit, and in which the frame is prevented from colliding against the main body when the image reader unit is rotated with respect to the main body, is provided.

According to an aspect of the present invention, an image forming apparatus is provided. The image forming apparatus includes a main chassis, which accommodates an image forming unit for forming an image on a recording sheet, an image reader unit, which is arranged in an upper position with respect to the main chassis and reads an image formed on a sheet, a cover unit, which is arranged in an upper position with respect to the image reader unit and to cover the image reader unit, a first movable assembly, which rotatably supports the cover unit to be rotatable with respect to the image reader unit, and a second movable assembly, which rotatably supports the image reader unit to be rotatable with respect to the main chassis. The first movable assembly includes a support member, which supports the cover unit to be vertically movable with respect to the image reader unit, and a frame, which is arranged on the image reader unit and accommodates the support member. The first movable assembly is arranged to have a lower end thereof to be in a lower position with respect to a lower end of the image reader unit. The second movable assembly is arranged in a lower position with respect to the first movable assembly.

BRIEF DESCRIPTION OF THE ACCOMPANYING DRAWINGS

DETAILED DESCRIPTION

Hereinafter, an embodiment of the present invention will be described with reference to the accompanying drawings.

[Overall Configuration of the Image Forming Apparatus]

Figure 1:
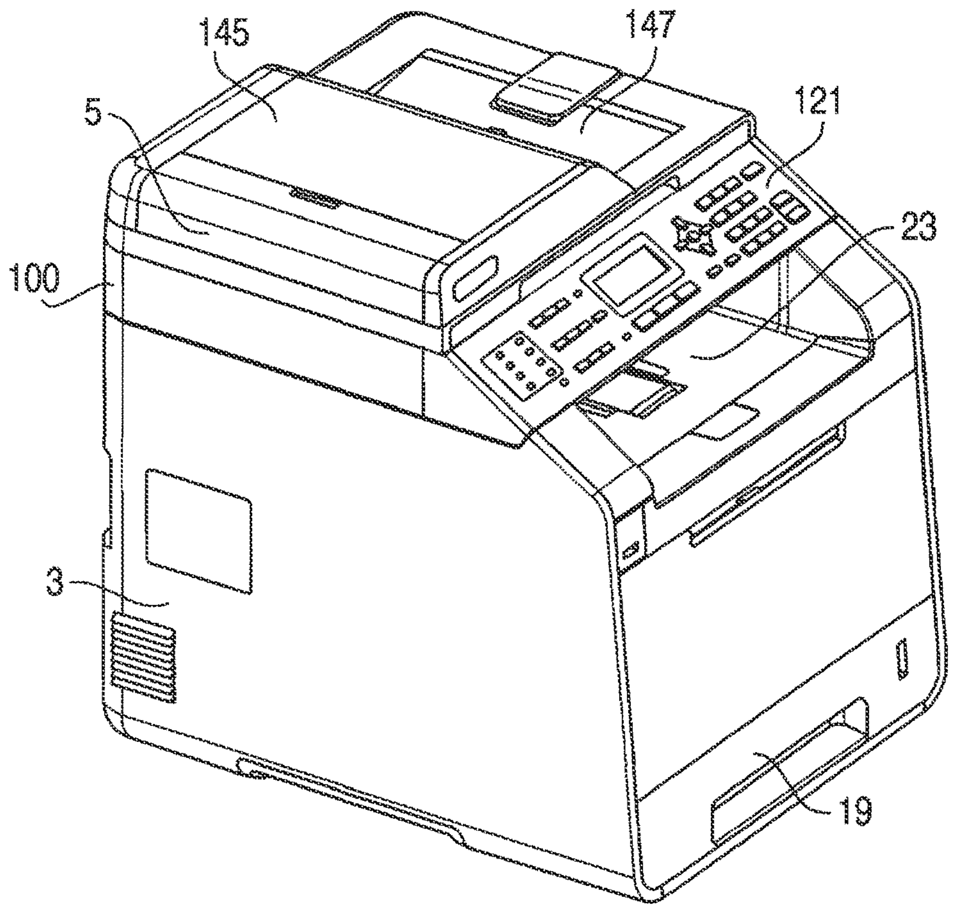
FIG. 1 is a perspective front view of the image forming apparatus according to the embodiment of the present invention with a document cover and an image reader unit being in closed positions.

An image forming apparatus 1 according to the embodiment has a main chassis 3, an image forming unit 2 inside the main chassis 3, and an image reader unit 100 on top of the main chassis 3. Further, the image forming apparatus 1 is provided with a document cover unit 5 having an auto document feeder (ADF) 145 on top of the image reader unit 100. The ADF 145 automatically feeds one or more sheets of document to the image reader unit 100 so that images formed on the sheets are automatically read by the image reader unit 100. The image forming unit 2 is designed to eject sheets, having been processed through the image forming apparatus 1, in a discharge tray 23. The discharge tray 23 is a receptacle for the ejected sheets and arranged in a position between the main chassis 3 and the image reader unit 100. In the present embodiment, directions concerning the image forming apparatus 1 will be referred to in accordance with orientation of the image forming apparatus 1 shown in FIG. 1. That is, a viewer's nearer right-hand side appearing in FIG. 1 is referred to as a front side of the image forming apparatus 1, and further left-hand side opposite from the front side is referred to as rear. Further, a side which corresponds to the viewer's nearer left-hand side is referred to as left, and an opposite side from the left, which corresponds to the viewer's further right-hand side is referred to as right. Furthermore, directions of the drawings in FIGS. 2-9 are similarly based on the orientation of the image forming apparatus 1 as defined above and correspond to those with respect to the image forming apparatus 1 shown in FIG. 1 even when the image forming apparatus 1 is viewed from different angles.

[Image Forming Unit]

Figure 2:
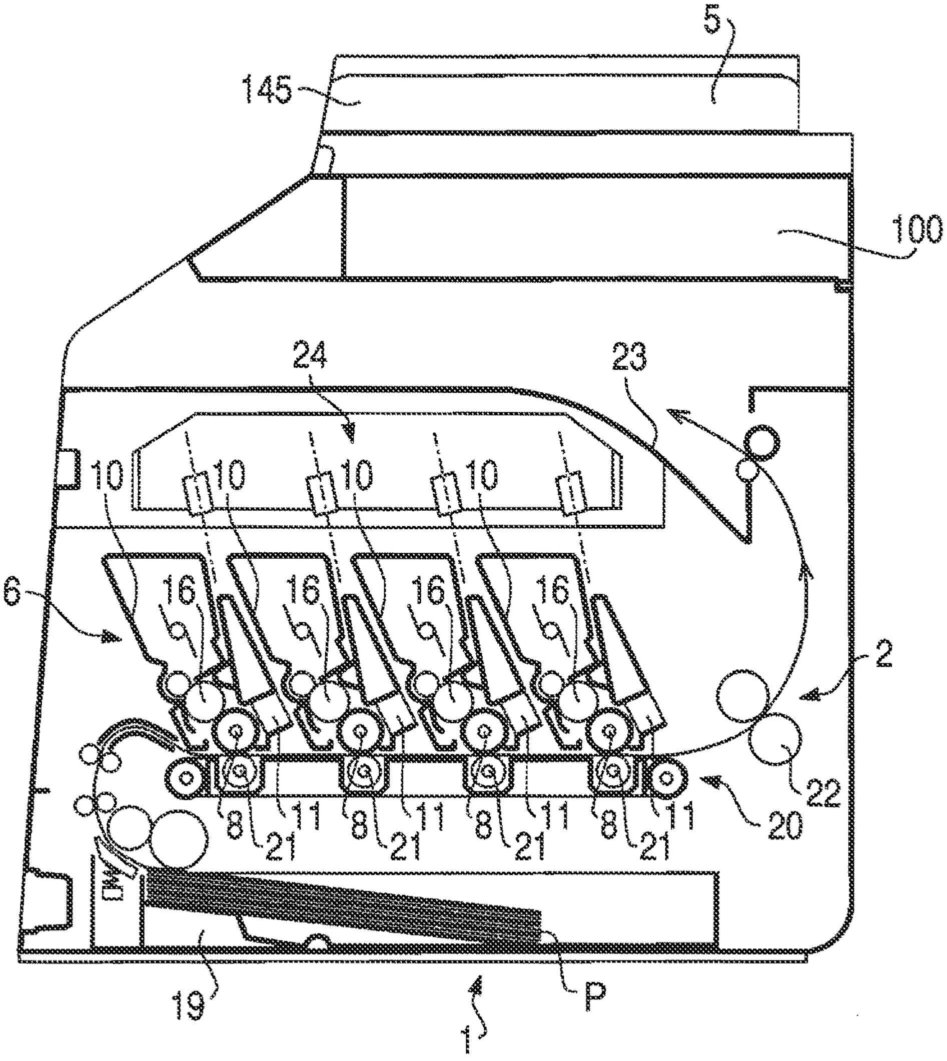
FIG. 2 is a cross-sectional side view of the image forming apparatus according to the embodiment of the present invention.
Figure 3:
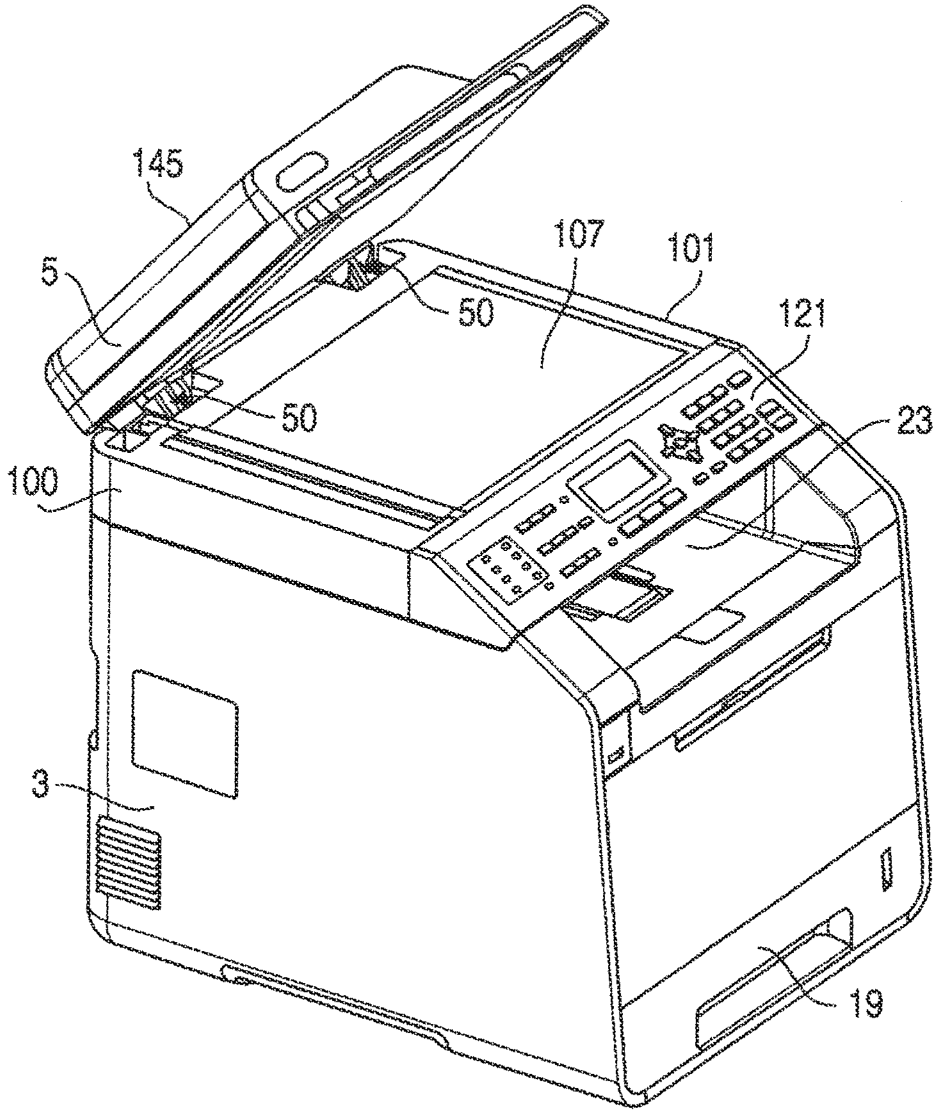
FIG. 3 is a perspective view of the image forming apparatus according to the embodiment of the present invention with the document cover being in an open position.
Figure 4:
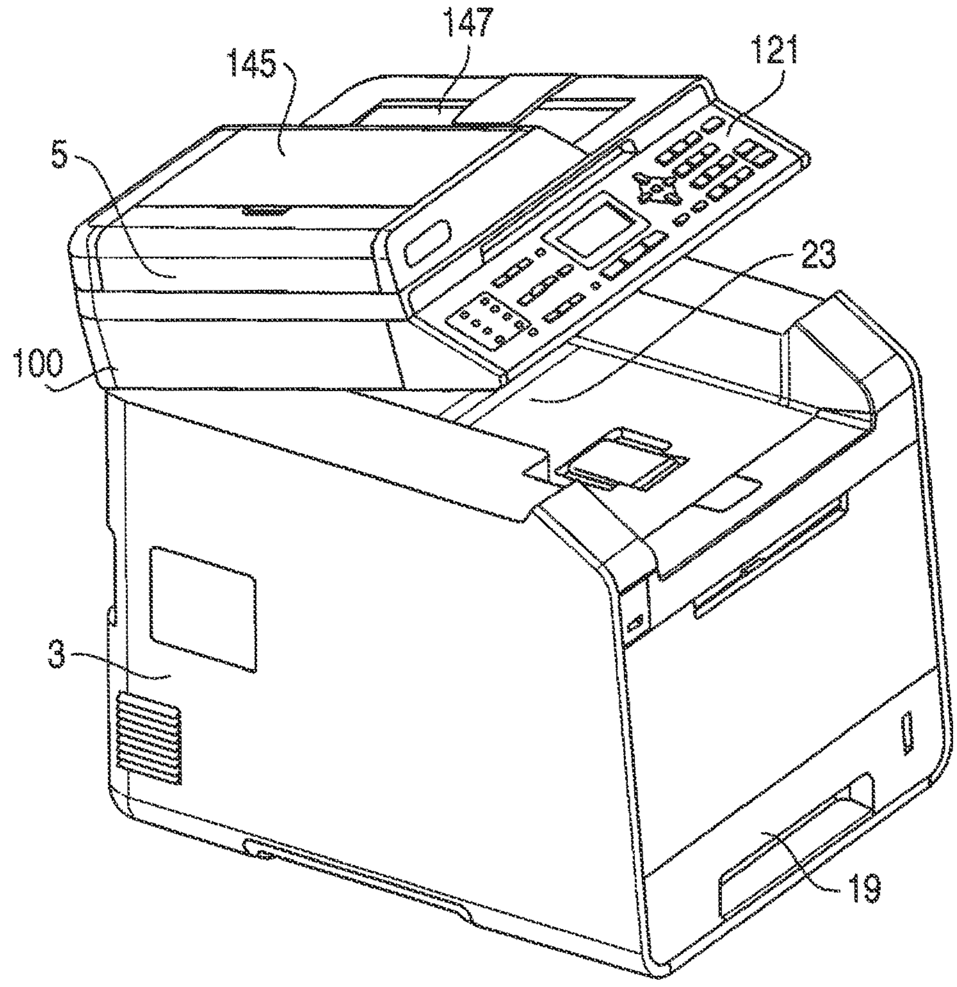
FIG. 4 is a perspective view of the image forming apparatus according to the embodiment of the present invention with the image reader unit being in an open position.

As shown in FIG. 2, the image forming unit 2 has a drum unit 6, which includes a plurality of (e.g., four) photosensitive drums 8. The photosensitive drums 8 are aligned at evenly-spaced intervals in line along a sheet-conveying direction, in which a sheet P is conveyed by a conveyer belt 20. The drum unit 6 further includes a plurality of (e.g., four) developer cartridges 10, each of which corresponds to one of the photosensitive drums 8. Within the main chassis 3, further, an exposure unit 24 is provided in an upper position with respect to the photosensitive drums 8.

In the image forming unit 2, a surface of the photosensitive drum 8 is evenly charged by a charger 11, and selectively exposed to a beam, which is emitted based on image data from the exposure unit 24, to form a latent image thereon. When the photosensitive drum 8 with the latent image becomes in contact with a developer roller 16 in the developer cartridge 10, the latent image is supplied with toner from the developer roller 16 and developed to be a toner image.

The image forming unit 2 is provided with a sheet-feed cassette 19, in which sheets P are stored, in a bottom section in the main chassis 3. The sheets P in the sheet-feed cassette 19 are conveyed one-by-one by rollers (unsigned) to the conveyer belt 20. The conveyer belt 20 is arranged to face the photosensitive drums 8 in a lower position with respect to the photosensitive drums 8. Further, a plurality of (e.g., four) transfer rollers 21 are arranged in positions opposite from the photosensitive drums 8 across an upper section of the conveyer belt 20. The sheet P carried to the conveyer belt 20 is forwarded by rolling movement of the conveyer belt 20 to pass through the photosensitive drums 8 and the transfer rollers 21. Thus, the toner images formed on the surfaces of the photosensitive drums 8 are transferred onto the sheet P by transfer biases applied to the transfer rollers 21.

The image forming unit 2 is further provided with a fixing unit 22 in a downstream position with respect to the conveyer belt 20 along the sheet-conveying direction. The fixing unit 22 includes a heat roller (unsigned) and a pressure roller (unsigned), by which the toner images transferred to the sheet P are fixed thereon. The sheet P with the fixed toner images is carried further by rollers (unsigned) to be ejected and settled in the discharge tray 23.

[Image Reader Unit]

The image reader unit 100 is a flatbed scanner and has an upper chassis 101, which can be laid above the discharge tray 23. The upper chassis 101 is rotatable with respect to the main chassis 3 about a second rotation shaft 63 (see FIG. 6) of a second rotatable assembly 60 (see also FIG. 5), which is arranged on the rear side of the upper chassis 101 and the main chassis 3. The second rotatable assembly 60 will be described later in detail. The image reader unit 100 has an image sensor unit (not shown) inside the upper chassis 101. Further, the image reader unit 100 has a platen glass 107, on which documents to be read by the image sensor are placed, on top of the upper chassis 101. The image reader unit 100 is further provided with an operation panel 121, which is used by a user to manipulate the image forming apparatus 1.

The image sensor unit has a light source and a plurality of photo diodes aligned in line. As the image sensor unit is moved to scan the image on the document, the light source emits light toward the document placed on the platen glass 107, and the photo diodes receive the light reflected on the document. The photo diodes convert the received light into electrical signals on a pixel basis. Thus, the signals representing the read image, which is formed on the document on the platen glass 107, are generated.

[Document Cover Unit 5]

The document cover unit 5 is formed in a shape and a size to cover the platen glass 107. The document cover unit 5 is rotatably connected to the image reader unit 100 by a first rotatable assembly 50 to rotate with respect to the image reader unit 100.

Figure 5:
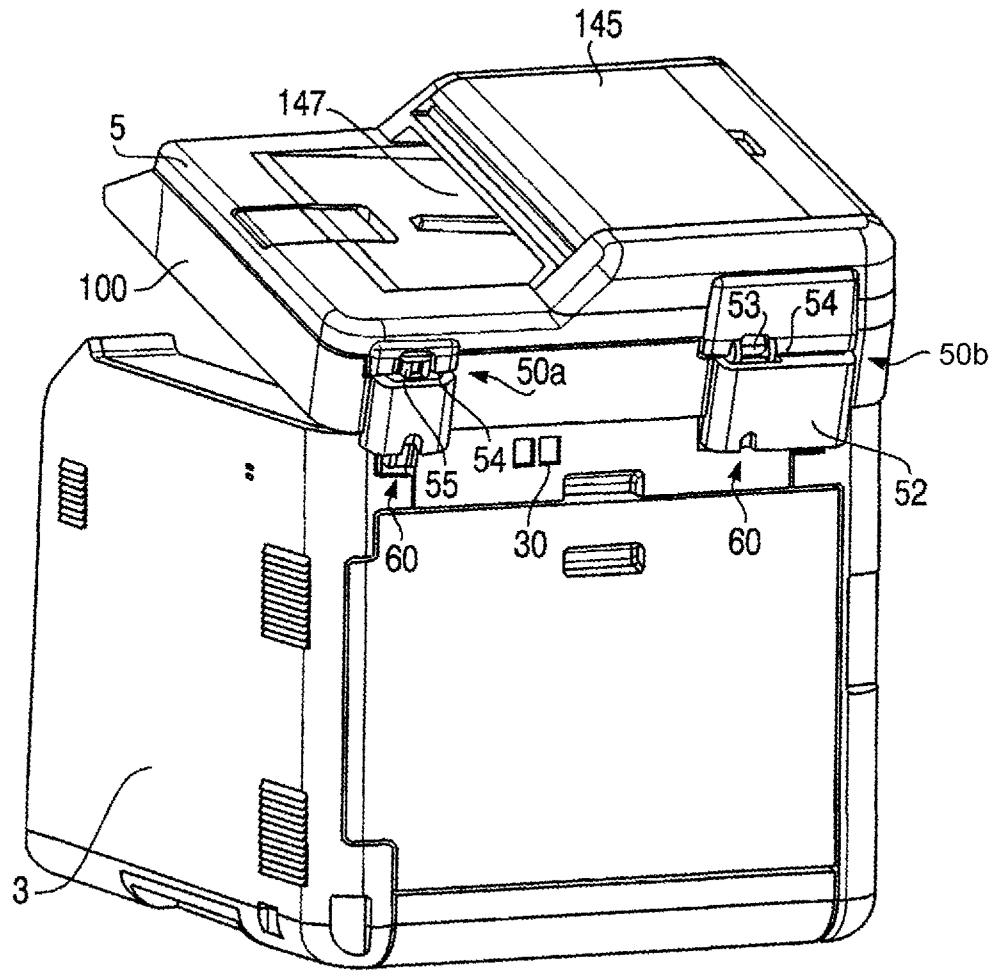
FIG. 5 is a perspective rear view of the image forming apparatus according to the embodiment of the present invention with the image reader unit being in the open position.

When the document with the image to be read is set in the image forming apparatus 1, the user may uplift a front side of the document cover unit 5 to rotate the document cover unit 5 with respect to the image reader unit 100 about a first rotation shaft 53, which is arranged on the rear side of the image forming apparatus 1 (see FIG. 5). Thus, the platen glass 107 is exposed. Alternatively, the user may use the ADF 145 in order to have the document fed in the image reader unit 100. When the ADF 145 is used, documents placed in a document-sheet tray 147 are conveyed one-by-one in the vicinity of the image sensor unit, which is not moved but fixed in a position. As the document sheet is moved over the fixed image sensor unit, the image formed on the document sheet is read by the image sensor.

[First Rotatable Assembly]

The image forming apparatus 1 is provided with the first rotatable assembly 50, which includes a first section **50*a* and a second section 50*b*, on the rear side of the main chassis 3. The first and second sections 50*a*, 50*b* are similarly configured except widthwise sizes of frames 52 thereof. In the following description, the first section 50*a* represents the first rotatable assembly 50 and may be referred to as the first rotatable assembly 50*a***.

Figure 6:
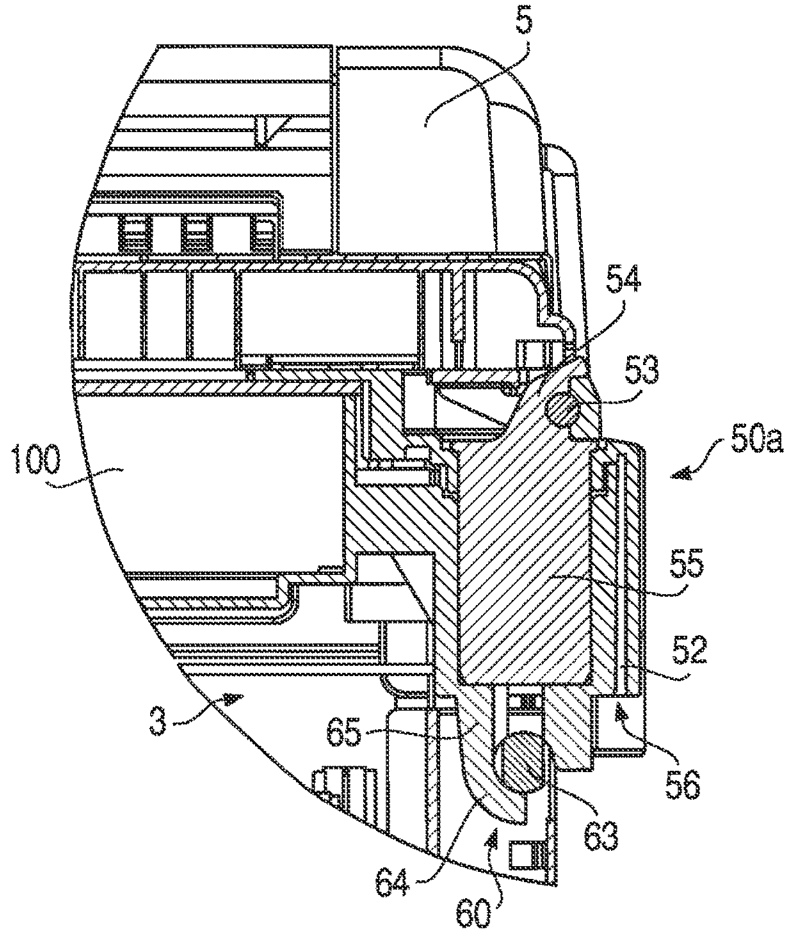
FIG. 6 is an enlarged partial view of the image forming apparatus according to the embodiment of the present invention with the document cover and the image reader unit being in the closed positions.
Figure 7:
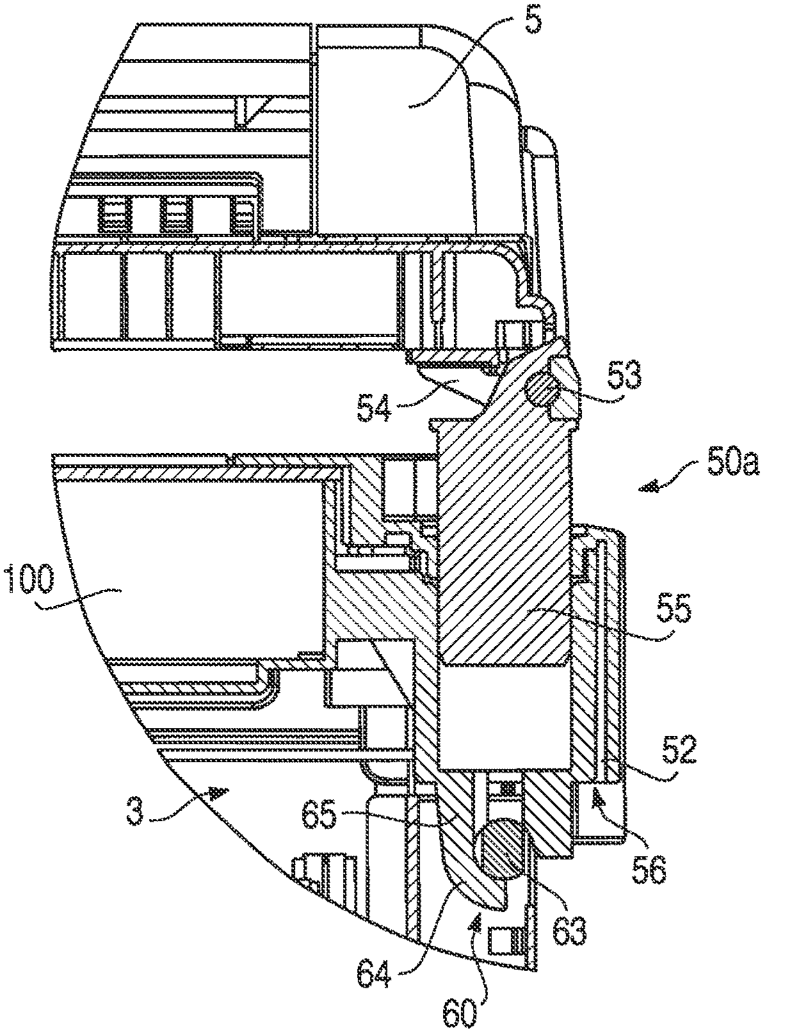
FIG. 7 is an enlarged partial view of the image forming apparatus according to the embodiment of the present invention with the document cover being in an uplifted position.
Figure 8:
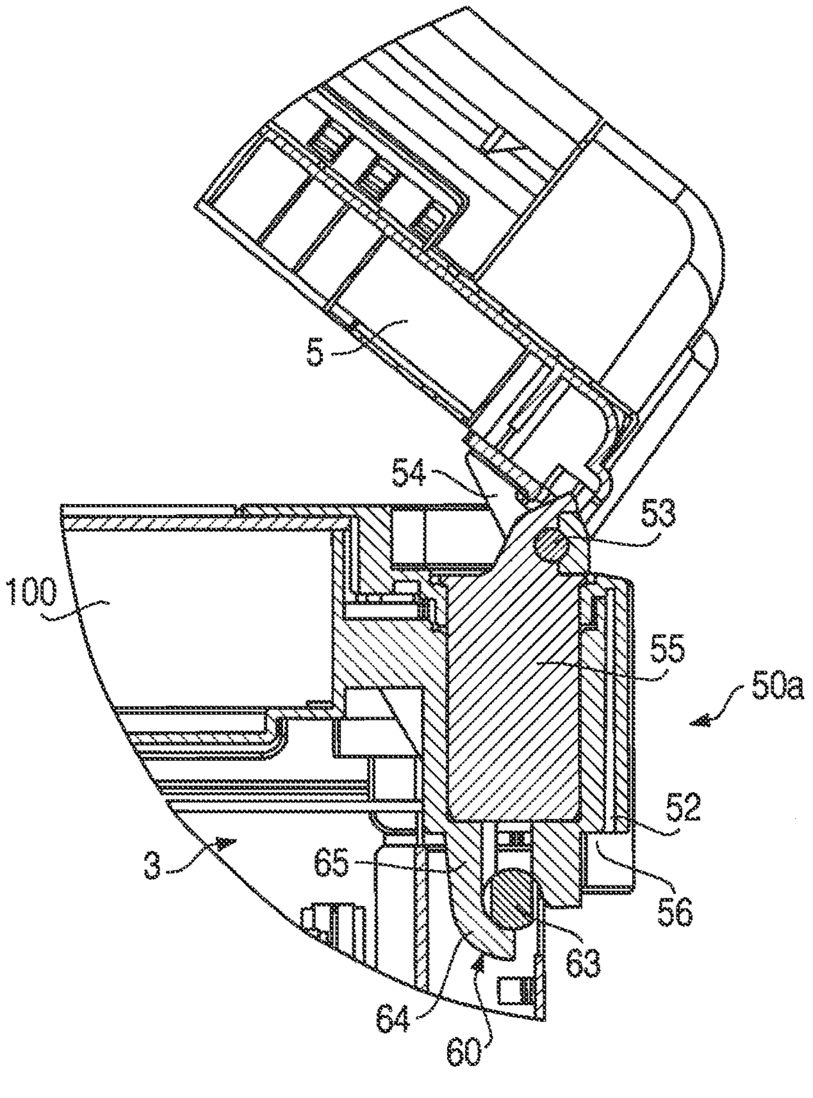
FIG. 8 is an enlarged partial view of the image forming apparatus according to the embodiment of the present invention with the document cover being in the open position.

As shown in FIG. 6, the first rotatable assembly **50*a* includes a box-shaped frame 52, a first rotation shaft 53, a support 55, and a first bearing 54. The frame 52 is arranged on the rear side of the image reader unit 100, and the first rotation shaft 53 is arranged on the rear side of the document cover unit 5. The support 55 is arranged inside the frame 52, and the first bearing 54 is in an upper section with respect to the support 55 and formed integrally with the support 55. The first rotation shaft 53** being rotatably supported in the first bearing 54 enables the document cover unit 5 to be rotatable with respect to the image reader unit 100 (see FIG. 8).

The support 55 is vertically movable with respect to the frame 52. Accordingly, the document cover unit 5 is vertically movable with respect to the image reader unit 100 (see FIG. 7). With the vertical movable structure, even a page in a bundle of document sheets (e.g., a book) can be placed steadily on the platen glass 107 to be read by the image sensor. A vertical range in which the document cover unit 5 is movable depends on vertical length of the support 55.

[Second Rotatable Assembly]

The second rotatable assembly 60 is arranged on the rear side of the main chassis 3 and includes a second rotation shaft 63, a second bearing 64, and an extended section 65 (see FIG. 6). The second rotation shaft 63 is arranged in a position lower than a lower end 56 of the frame 52 of the first rotatable assembly 50. The second bearing 64 is in a lower position with respect to the frame 52 and formed integrally with the frame 52. The extended section 65 is extended from the lower end of the frame 52 to a position in the vicinity of the second rotation shaft 63 and connects the frame 52 to the second bearing 64.

The second rotation shaft 63 being rotatably supported in the second bearing 64 enables the image reader unit 100 to be rotatable with respect to the main chassis 3.

Figure 9:
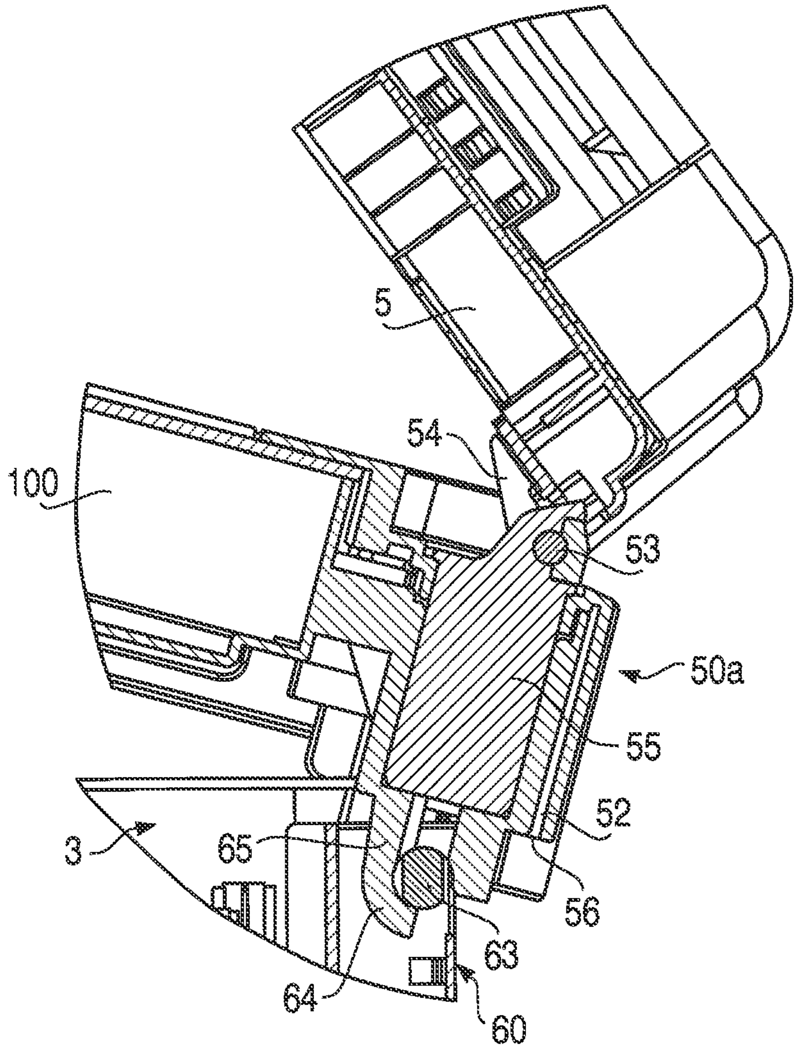
FIG. 9 is an enlarged partial view of the image forming apparatus according to the embodiment of the present invention with the document cover and the image reader unit being open.
Figure 10C:
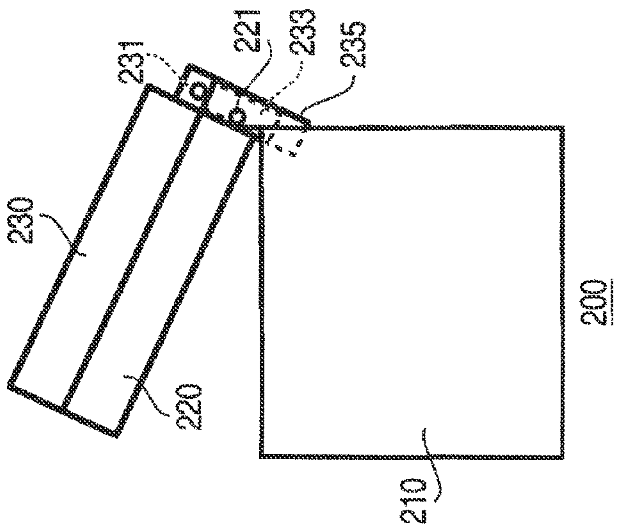
FIGS. 10A-10C are illustrative views of a conventional image forming apparatus.
Figure 10B:
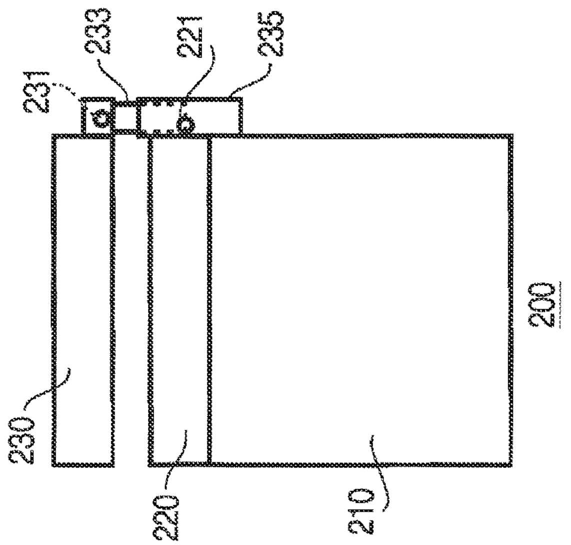
Figure 10A:
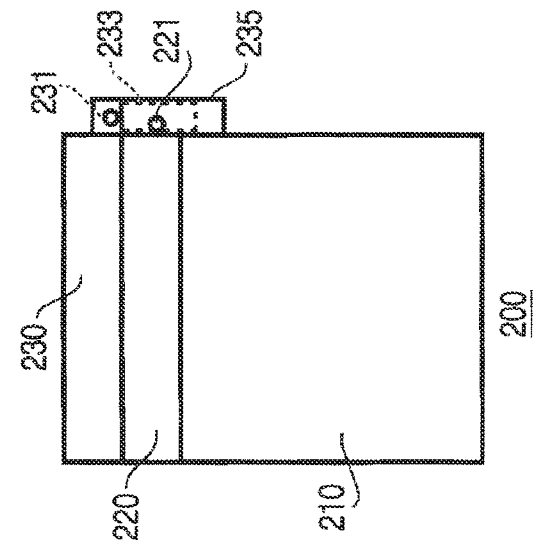

The document cover unit 5 and the image reader unit 100 are movable independently from each other by the structures of the first rotatable assembly 50 and the second rotatable assembly 60 respectively (see FIG. 9). That is, the document cover unit 5 is rotatable about the first rotation shaft 53, and the image reader unit 100 is rotatable about the second rotation shaft 63. With the second rotation shaft 63, which is the rotation axis of the image reader unit 100, being in the position lower than the lower end 56 of the frame 52, interference of the frame 52 with the main chassis 3 is prevented even when the image reader unit 100 is rotated. Accordingly, the space to accommodate the frame 52 in the main chassis 3 is not required. Thus, the internal space in the main body 210 can be efficiently used without the limitation of the accommodating space.

In the present embodiment, the image forming apparatus 1 is provided with the first rotatable assembly 50 and the second rotatable assembly 60 on the rear side of the main chassis 3. More specifically, the first section 50*a* and the second section 50*b* of the first rotatable assembly 50 are arranged on the rear side of the main chassis 3, and the second rotatable assembly 60 is arranged in a range between outer widthwise ends of the first rotatable assembly 50. In this regard, the range between the outer widthwise ends of the first rotatable assembly 50 refers to a horizontal range between a right-side end (i.e., the left-hand end appearing in FIG. 5) of the first section 50*a* and a left-side end (i.e., the right-hand end appearing in FIG. 5) of the second section 50*b*. In other words, the second rotatable assembly 60 is arranged in the widthwise range of the first rotatable assembly 50. According to the arrangement, the width of the image forming apparatus 1 is more efficiently used compared to arrangement, in which the second rotatable assembly 60 is arranged outside the range between the outer widthwise ends of the first rotatable assembly 50.

When the second rotatable assembly 60 is arranged in the lower position than the first rotatable assembly 50, in particular, lower than the lower end 56 of the first rotatable assembly 50*a*, the second rotation shaft 63 is in a position apart from the image reader unit 100. Therefore, in order to connect the second rotation shaft 63 with the image reader unit 100, an elongated extended section 65 is required. However, with the extended section 65 being elongated, intensity of the longer extended section 65 is lowered, and the longer extended section 65 may not be capable of supporting the image reader unit 100.

In the present embodiment, therefore, the second rotatable assembly 60 is arranged immediately below each of the frames 52 of the first rotatable assembly 50 and formed integrally with the frame 52. According to the structure, the extended section 65 can be shortened, and the intensity of the extended section 65 to support the image reader unit 100 can be maintained.

In the present embodiment, the image forming apparatus 1 has a network control unit (NCU) 30 (see FIG. 5) in a position opposite from the frame 52 within the main chassis 3. According to the arrangement, the NCU 30 can be installed without requiring additional space in the main chassis 3 and without requiring modification of arrangement within the image forming unit 2.

Additional Examples

Although an example of carrying out the invention has been described, those skilled in the art will appreciate that there are numerous variations and permutations of the image processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiment, the first rotation shaft 53 is arranged on the rear side of the document cover unit 5, and the first bearing 54 is provided to the support 55. However, the first rotation shaft 53 and the first bearing 54 may be in reversed arrangement. Further, a plurality of first rotatable assemblies 50 may be provided, and the arrangement of the first rotation shaft 53 and the first bearing 54 may be reversed similarly within each of the first rotatable assemblies 50.

For another example, the second bearing 64 instead of the second rotation shaft 63 may be arranged in the main chassis 3, and the second rotation shaft 63 instead of the second bearing 64 may be formed integrally with the frame 52 in the position below the frame 52. Further, a plurality of second rotatable assemblies 60 may be provided, and the arrangement of the second rotation shaft 63 and the second bearing 64 may be similarly reversed within each of the second rotatable assemblies 60.

What is claimed is:

1. An image forming apparatus, comprising:

a main chassis configured to accommodate an image forming unit configured to form an image on a recording sheet;

an image reader unit arranged in an upper position with respect to the main chassis and configured to read an image formed on a sheet;

a cover unit arranged in an upper position with respect to the image reader unit and configured to cover the image reader unit;

a first movable assembly configured to rotatably support the cover unit to be rotatable with respect to the image reader unit; and a second movable assembly configured to rotatably support the image reader unit to be rotatable with respect to the main chassis about a rotational axis, wherein the first movable assembly includes:

a support member configured to support the cover unit to be vertically movable with respect to the image reader unit, and a frame arranged to protrude to an exterior of the image reader unit in a direction orthogonal to a vertical direction and an axial direction of the rotational axis, and configured to accommodate the support member therein;

wherein the first movable assembly includes a lower end situated below a lower end of the image reader unit; and wherein the second movable assembly is arranged immediately below the frame of the first movable assembly in both the vertical direction and the axial direction of the rotational axis.

2. The image forming apparatus according to claim 1, wherein the second movable assembly is arranged within a widthwise range of the first movable assembly.

3. The image forming apparatus according to claim 2, wherein the first movable assembly includes a first section and a second section, wherein the first section and the second section are arranged on a same plane in the image forming apparatus; and wherein the second movable assembly is arranged in a range between the first section and the second section of the first movable assembly.

4. The image forming apparatus according to claim 1, wherein the second movable assembly includes a rotation shaft and a bearing; and wherein one of the rotation shaft and the bearing is formed integrally with the first movable assembly in a lower position with respect to the first movable assembly.

5. The image forming apparatus according to claim 1, wherein the cover unit includes an auto document feeder, wherein the auto document feeder is configured to automatically feed the recording sheet with the image formed thereon to the image reader unit.

6. The image forming apparatus according to claim 1, further comprising:

a sheet receptacle, in which the recording sheet with the image formed thereon is settled, in a position between the main chassis and the image reader unit.

7. The image forming apparatus according to claim 1, further comprising:

a communication device arranged within the main chassis in a position opposite from the frame of the first movable assembly.

8. The image forming apparatus according to claim 1, wherein the rotational axis of the image reader unit is disposed at a lower vertical position than a bottom surface of the image reader unit.

* * * * *